United States Patent [19]
Shockley, Jr.

[11] 3,987,986
[45] Oct. 26, 1976

[54] PORTABLE AIRCRAFT HAND CONTROLS
[75] Inventor: James E. Shockley, Jr., Sturgis, Ky.
[73] Assignee: Union Aviation, Inc (Entire), Sturgis, Ky.
[22] Filed: June 18, 1975
[21] Appl. No.: 587,908

[52] U.S. Cl. .............................. 244/83 F; 74/481; 74/544
[51] Int. Cl.² ....................................... B64C 13/04
[58] Field of Search .......... 244/83 F, 86; 180/77 R, 180/77 H; 74/471 R, 481, 491, 478.5, 544; 188/106 R

[56] References Cited
UNITED STATES PATENTS

| | | | |
|---|---|---|---|
| 2,516,397 | 7/1950 | Kress et al. | 244/86 X |
| 3,373,628 | 3/1968 | Lake et al. | 74/544 X |
| 3,377,881 | 4/1968 | Lucas | 244/86 X |

Primary Examiner—Trygve M. Blix
Assistant Examiner—Barry L. Kelmachter
Attorney, Agent, or Firm—Clarence A. O'Brien; Harvey B. Jacobson

[57] ABSTRACT

A connecting bar is provided for extending between the combined rudder and wheel brake controlling pedals of an aircraft and includes a centrally disposed rearwardly and upwardly inclined control arm or handle portion. The opposite ends of the bar are connected to the associated combined rudder and wheel brake controlling pedals in a manner enabling lateral deflection of the upper end of the control arm or handle portion to actuate the rudder controlling movement of the corresponding pedal, upward displacement of the control arm or handle portion to effect wheel brake application movement of both rudder pedals, and simultaneous upward and lateral deflection of the control arm or handle portion to effect rudder actuation and wheel brake application movement of the corresponding rudder pedal. The structure by which the opposite ends of the bar are connected to the associated pedals enables the pedal controlling structure to be readily removed from the associated aircraft, the pedal controlling structure being specifically designed for use by pilots unable to properly actuate rudder and/or rudder and brake controlling pedals with their feet.

8 Claims, 6 Drawing Figures

PORTABLE AIRCRAFT HAND CONTROLS

BACKGROUND OF THE INVENTION

The control structure of the instant invention has been designed for use in aircraft having rudder pedals and/or aircraft provided with rudder and wheel brake controlling pedals. The control structure is simply constructed and readily attachable to the associated pedals in a removable manner.

Many persons wishing to learn how to fly aircraft and also persons having aircraft piloting ability do not have total use of their legs and are therefore severly handicapped in learning or continuing to fly aircraft. Accordingly, a need exists for the provision of a control structure enabling the rudder and/or combined rudder and brake pedals of an aircraft to be easily actuated by hand.

While various forms of multiple movement hand operated controlling devices have been heretofore designed including at least some specifically designed to enable hand operation of aircraft rudder controls, these previously known control structures are not readily adaptable to various types of aircraft in a readily attachable and removable manner. Further, they do not provide an aircraft rudder pedal controlling structure which may be readily hand actuated with proficiency to the degree often required in various flying environments.

Examples of previously designed multiple movement controlling structures are disclosed in U.S. Pat. Nos. 2,318,833, 2,602,348, 3,187,845, 3,611,827, 3,757,597 and 3,768,328.

BRIEF DESCRIPTION OF THE INVENTION

The portable aircraft hand control structure of the instant invention has been specifically designed to enable a learning or experienced pilot to proficiently control the rudder pedals of an aircraft including aircraft having rudder pedals oscillatable about horizontal transverse axes for control of the wheel brakes of the aircraft. The pedal controlling structure is readily mountable in and removable from aircraft having rudder controlling pedals and may therefore be transferred from one aircraft to another. Also, the pedal controlling structure is of a simple design enabling it to be readily produced at minimum cost.

The main object of this invention is to provide an aircraft rudder pedal controlling structure for attachment to the rudder pedals or rudder and brake pedals of aircraft and including structure whereby the associated pedals may be readily actuated by hand.

Another object of this invention, in accordance with the immediately preceding object, is to provide a pedal controlling structure which is readily adaptable for use in different aircraft equipped with rudder pedals.

A further object of this invention is to provide a rudder pedal controlling structure which may be readily removably mounted in an associated aircraft and transferable from one aircraft to another.

A final object of this invention to be specifically enumerated herein is to provide an aircraft rudder pedal and wheel brake controlling structure in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
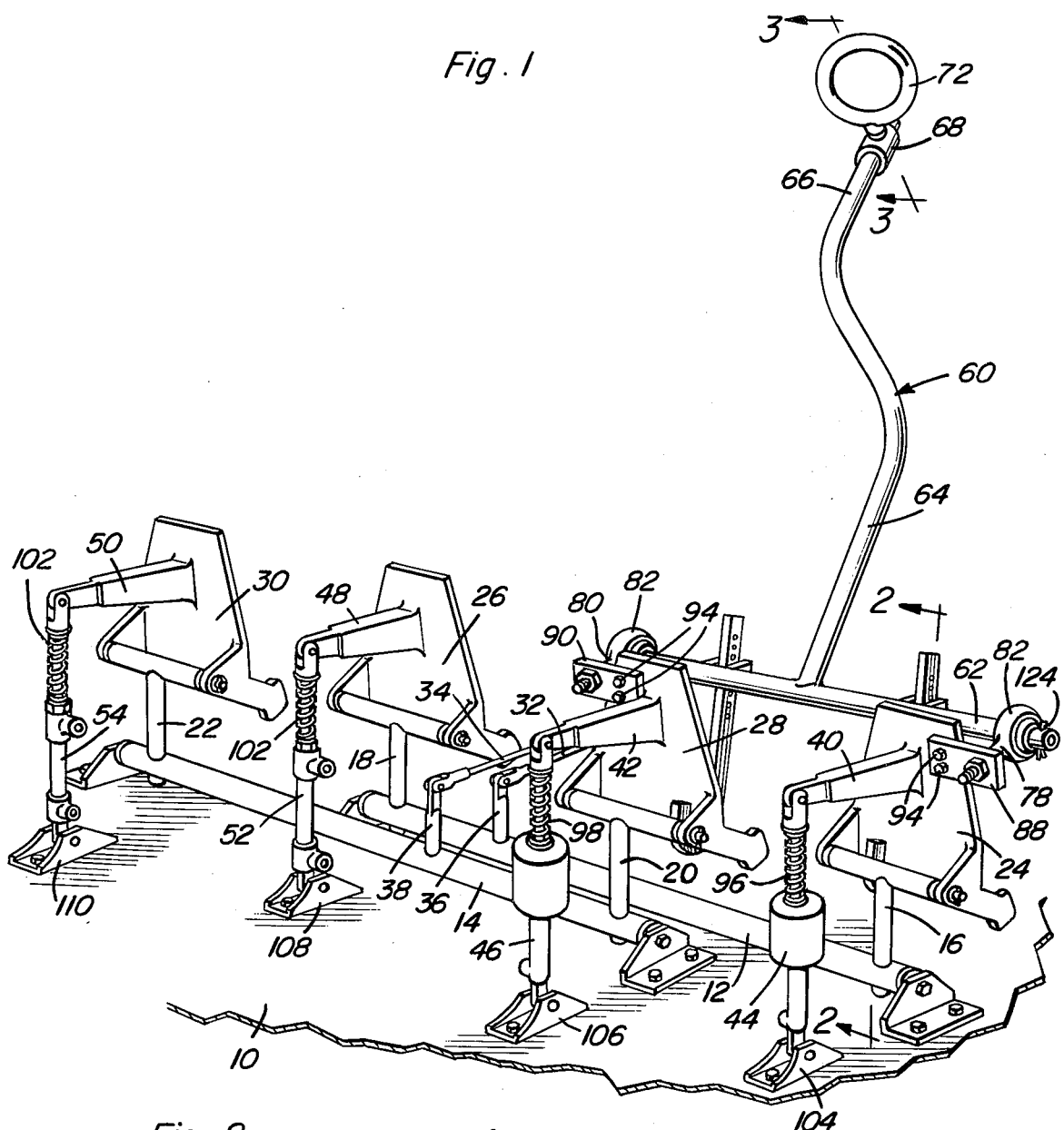
FIG. 1 is a perspective view of a conventional form of dual position rudder and brake controlling pedal structure for aircraft with the portable aircraft hand control assembly of the instant invention operatively associated with the rudder and brake controlling pedals of one position thereof.

Referring now more specifically to the drawings the numeral 10 generally designates a fragmentary illustrated aircraft fuselage component from which a pair of conventional transversely extending rudder controlling shafts 12 and 14 are pivotally supported at their opposite ends. A pair of left rudder pedal supports 16 and 18 project upwardly from opposite ends of the shaft 12 and a pair of right rudder pedal supports 20 and 22 project upwardly from the opposite ends of the shaft 14. Combined rudder and wheel brake actuating pedals 24 and 26 are oscillatably supported from the upper ends of the supports 16 and 18 and combined rudder and wheel brake actuating pedals 28 and 30 are oscillatably supported from the upper ends of the supports 20 and 22. A pair of right and left rudder control shafts 32 and 34 have their forward ends pivotally secured to the upper ends of upwardly projecting crank arms 36 and 38 mounted on the shafts 12 and 14 and the upper portions of the pedals 24 and 28 include forwardly projecting arms 40 and 42 operatively connected to oscillatably mounted left and right wheel brake actuating structures 44 and 46. The rear ends of shafts 32 and 34 are connected to the rudder (not shown) of the aircraft for applying right and left rudder and the shafts 32 and 34 reciprocate inversely with right and left rudder being applied in response to forward displacement of the shafts 32 and 34, respectively. Also, the pedals 26 and 30 include similar forwardly projecting arms 48 and 50 operatively connected to the upper ends of a second pair of upstanding oscillatable left and right wheel brake actuating structures 52 and 54.

The foregoing comprises a description of one conventional form of aircraft rudder and brake pedal actuating structure. Of course, the pedals 26 and 30 comprise duplicate pedals for actuation by a person seated in the co-pilot's seat while the pedals 24 and 28 comprise the rudder and brake controlling pedals operable from the pilot's seat. Therefore, actuation of either the pedals 24 and 28 or the pedals 26 and 30 will operate the left and right rudder and wheel brake controls of the associated aircraft. Forward displacement of the pedal 24 (to the left as viewed in FIG. 1 of the drawings) will apply left rudder whereas forward displacement of the pedal 28 (to the left as viewed in FIG. 1) will apply right rudder. Further, forward rocking of the left pedal 24 will apply the left wheel brake and forward rocking of the pedal 28 will apply the right wheel brake, the pedals 24 and 28 being capable of simultaneous forward rocking for application of both the left and right wheel brakes.

Figure 3:
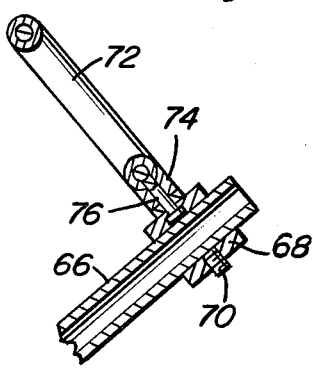
FIG. 3 is an enlarged fragmentary vertical sectional view taken substantially upon the plane indicated by the section line 3—3 of FIG. 1.

The hand control assembly of the instant invention is referred to in general by the reference numeral 60 and includes a horizontal transverse connecting bar 62 provided with a central rearwardly and upwardly projecting control arm or handle portion 64 having a laterally offset upper end portion 66. A mounting ring 68 is fixed in adjusted angularly displaced and longitudinally shifted position on the upper end portion 66 by means of a setscrew 70 (see FIG. 3) and a control ring 72 provided with a short radially outwardly projecting shank 74 is supported from the mounting ring 68 for oscillation relative thereto as at 76 about an axis substantially coinciding with the center axis of the shank 74.

Figure 5:
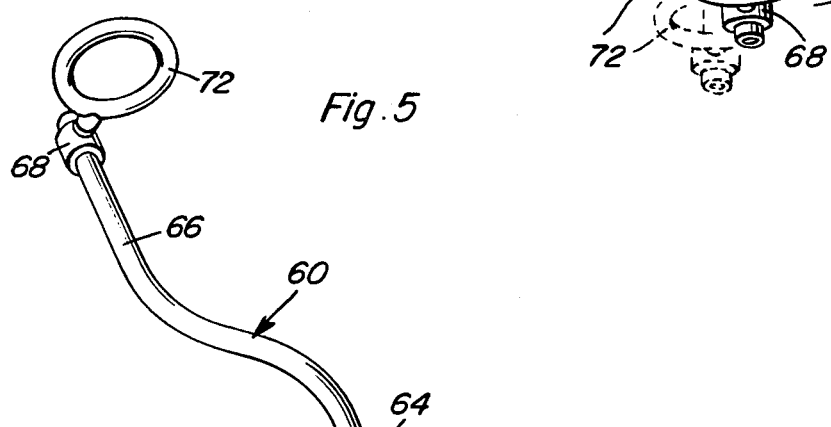
FIG. 5 is a perspective view of the portable hand control assembly of the instant invention with some parts thereof illustrated in exploded positions.

A pair of connecting rods 78 and 80 are provided with spherical bearing assemblies 82 on one pair of corresponding ends thereof by which the connecting rods 78 are supported from the opposite ends of the connecting bar 62 and the other pair of corresponding connecting ends of the connecting rod 78 are threaded as at 84 and 86 (see FIG. 5) and secured through apertured mounting brackets 88 and 90 by means of threaded nuts 92, the mounting brackets 88 and 90 being secured to the forward surfaces of the left and right hand portions of the left and right pedals 24 and 28, respectively, by means of suitable fasteners 94.

The brake actuating structures 44, 46, 52 and 54 include compression springs 96, 98 and 100, 102 whereby downward swinging movement of the forward ends of the arms 40, 42 and 48, 50 is resisted. However, the structures 44, 46, 52 and 54 are supported at their lower ends by means of brackets 104, 106 and 108, 110 for oscillation about horizontal transverse axes and may therefore be angularly displaced without application of the associated wheel brakes in response to fore and aft movement of the corresponding pedals.

Figure 2:
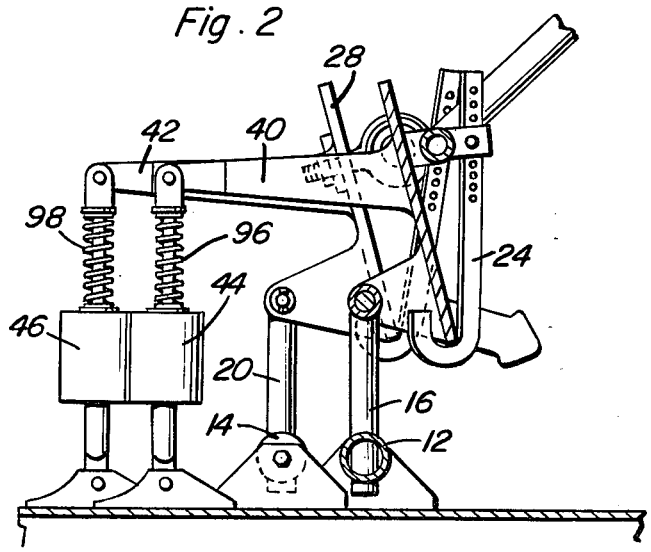
FIG. 2 is a fragmentary enlarged vertical sectional view taken substantially upon the plane indicated by the section line 2—2 of FIG. 1.

Those portions of the connecting bar 62 intermediate the handle portion 64 and the spherical bearings 82 include pairs of spaced apart rearwardly projecting mounting flanges 112 and the upper end portion 114 of a J-shaped hook 116 is pivotally secured between each pair of flanges 112 by means of a suitable fastener 118 passed through apertures provided therefor in the brackets 112 and one of the longitudinally spaced transverse bores 120 formed in the upper end portion 114. The lower hooked ends 122 of the hooks 116 are engaged with the lower marginal edge portions of the pedals 24 and 28 in a manner best illustrated in FIG. 2.

Accordingly, when the handle portion 64 is maintained in a transversely centered position and swung upwardly the pedals 24 and 28 are rocked forwardly at their upper ends in order to simultaneously operate the brake actuating structures 44 and 46 without also operating the rudder controls. Further, if the handle portion 64 is maintained in a vertically centered position and swung laterally to the left the left hand pedal 24 will be forwardly displaced in order to apply left rudder. Likewise, if the handle portion 64 is displaced to the right the rudder pedal 28 will be forwardly displaced in order to apply right rudder. Furthermore, if the handle portion 64 is displaced to the right and upwardly the right rudder pedal 28 will be forwardly displaced to apply right rudder and the right rudder pedal 28 will be rocked forwardly in order to actuate the right brake actuating structure 46. Conversely, if the handle portion 64 is displaced to the left and upwardly the left rudder pedal 24 will be forwardly displaced to apply right rudder and the pedal 24 will also be rocked forwardly so as to operate the left wheel brake actuating structure 44 to also apply the left wheel brake.

Of course, it may be readily seen that the control assembly 60 may be mounted on various aircraft and that in the event several different aircraft have mounting brackets corresponding to the brackets 88 and 90 mounted on the rudder pedals thereof the control assembly 60 may be easily shifted from one aircraft to the other merely by loosening and reapplying the forward pair of nuts 92. The specific lateral offset of the upper end portion 66 will be determined by the aircraft or type of aircraft upon which the control assembly is to be used.

Figure 4:
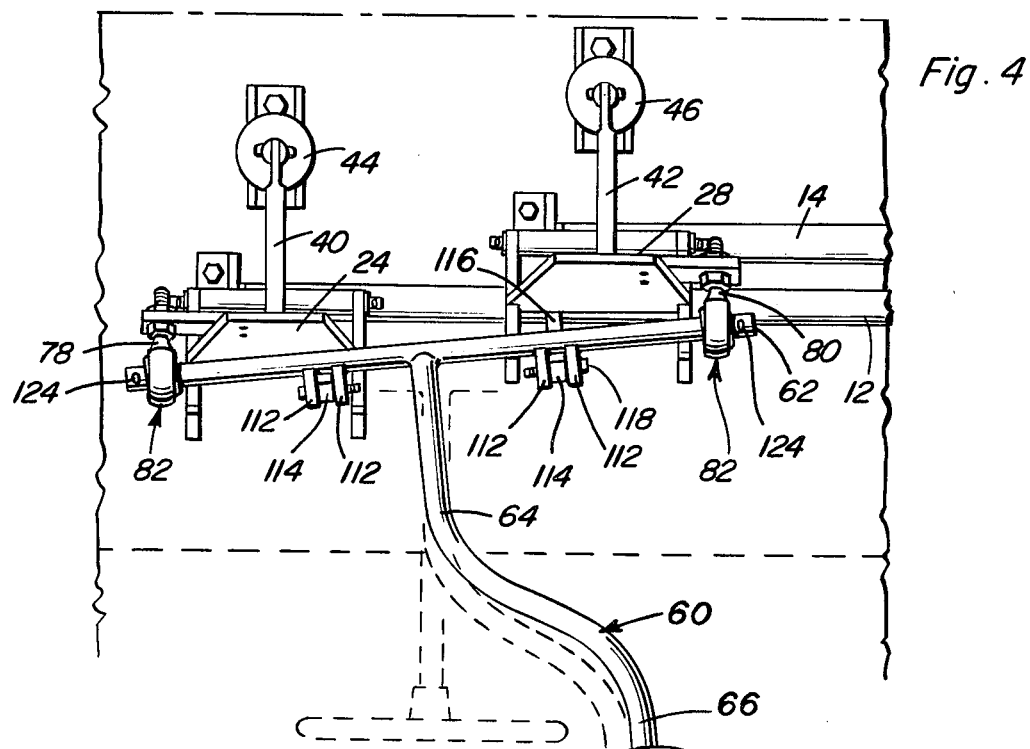
FIG. 4 is a fragmentary top plan view of that portion of the assemblage illustrated in the right hand portion of FIG. 1.

It is to be understood that the control shafts 32 and 34 interconnect the rudder pedal supporting shafts 12 and 14 with the rudder whereby forward displacement of one of the rudder pedals will result in rearward displacement of the other rudder pedal. Accordingly, with attention invited more specifically to FIG. 1 of the drawings, inasmuch as the ends or end portions of the connecting bar 62 are mounted from the remote sides of the rudder pedals 24 and 28 and the J-shaped hooks 116 are engaged with the adjacent sides of the rudder pedals 24 and 28, when the handle portion 64 is displaced to the right as viewed in FIG. 4 the connecting bar 62 will be inclined relative to the shaft 12 with the right hand end of the connecting bar 62 displaced forwardly of the left hand end of the bar 62 (the pedal 28 being displaced forwardly and the pedal 24 being displaced rearwardly). Thus, that portion of the control bar 62 supporting the left J-shaped hook 116 will be moved closer to the corresponding side of the rudder pedal 24 and that portion of the control bar 62 supporting the right hand J-shaped hook 116 will be moved further from the corresponding inner side of the pedal 28. Accordingly, when the handle portion 64 is upwardly displaced the right hand hook 116 will engage the lower marginal portion of the rudder pedal 28 so as to forwardly rock the rudder pedal 28 and apply the right hand brake before the left hand hook 116 abuts against the lower marginal edge of the left hand pedal 24. For this reason, the rudder pedals 24 and 28 may be independently rocked forwardly to corresponding brake application positions.

Figure 6:
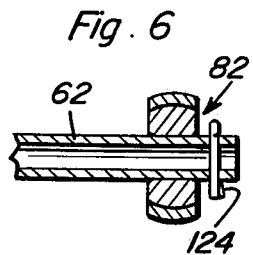
FIG. 6 is a fragmentary enlarged vertical sectional view taken substantially upon the plane indicated by the section line 6—6 of FIG. 5.

In addition, when the bar 62 is inclined so as to forwardly displace one of the pedals 24 and 28 and rearwardly displace the other pedal the spacing between the mounting brackets 88 and 90 is increased. Accordingly, the spherical bearings 82 at least partially compensate for this increase in spacing between the brackets 88 and 90. Further, the inner portions of the spherical bearings 82 such as that illustrated in FIG. 6 are slidably mounted on the connecting bar 62 and the connecting bar 62 includes opposite end pins 124 with which the corresponding inner portions of the spherical bearing assemblies 82 may be engaged to limit their displacement toward the terminal ends of the bar 62.

Further, the upper end portion 66 of the control arm 64 may be oppositely laterally offset to enable the control assembly 60 to be used at the co-pilot position. Also, the brackets 88 and 90 may be mounted on the rear surfaces of the pedals 24 and 28, in some instances and although the brake actuating structures 44 and 46 comprise hydraulic cylinders it is to be noted that the control assembly 60 may also be used in conjunction with rockable pedals associated with other means for actuation of the corresponding wheel brakes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with aircraft controls of the type including a pair of horizontally transversely spaced apart side by side right and left fore and aft shiftable rudder controlling foot pedals, a hand control member including a connecting member extending between said pedals, support means supporting spaced portions of said connecting member from said pedals for angular displacement of said spaced portions, and thus said connecting member, relative to said pedals about upstanding axes, and a control arm portion connected rigidly to and extending rearwardly and upwardly from said connecting member in a direction generally transverse to a line extending between said pedals, the free end of said control arm portion being adapted to be grasped and horizontally laterally displaced by the operator of the associated aircraft.

2. The combination of claim 1 wherein said support means also includes means supporting said spaced portions of said connecting member from said pedals for angular displacement of said connecting member relative to pedals about substantially aligned axes extending between said spaced portions, said pedals being supported for independent oscillation about horizontal transverse axes between wheel brake applied and wheel brake off positions, and means operatively connecting said spaced portions of said connecting member and the corresponding pedals for selectively shifting both pedals to the brake applied positions thereof upon upward displacement of the rear portion of said control arm portion when the control arm portion is in a transversely centered position and independent shifting of each brake pedal in response to combined upward and lateral displacement of the rear portion of said control arm portion in the lateral direction corresponding to the rudder pedal to be shifted to the brake applied position.

3. The combination of claim 1 wherein said control arm portion includes a laterally offset upper end portion.

4. The combination of claim 1 including a handle defining ring supported from the free end portion of said control arm portion for oscillation relative to the control arm portion about an axis disposed, generally, in a diametric plane of said ring and at right angles relative to said support arm.

5. In combination with aircraft controls of the type including a pair of horizontally transversely spaced apart side by side right and left fore and aft shiftable rudder controlling foot pedals, and also supported for independent oscillation about horizontal transverse axes between wheel brake applied and wheel brake off positions an elongated connecting member extending between said pedals and having the forward end of a rearwardly and upwardly inclined control arm supported therefrom intermediate the opposite end portions of said connecting member, said control arm having a free end adapted to be horizontally, laterally displaced by an operator of the aircraft, a pair of elongated connecting elements first means connecting one pair of corresponding ends of said connecting elements to corresponding end portions of said connecting member for at least limited pivotal movement of the connecting member relative to said elements about upstanding axes and second means rigidly anchoring the other pair of corresponding ends of said elements to said pedals.

6. The combination of claim 5 wherein said connecting member is disposed to the rear of the upper end portions of said pedals.

7. The combination of claim 5 wherein said pedals are also supported for independent oscillation about horizontal transverse axes between brake applied and brake off positions, said first means including means also supporting said one pair of corresponding ends of said elements from said end portions of said connecting member for at least limited oscillation relative thereto about pivot axes extending longitudinally of said connecting member.

8. The combination of claim 5 wherein said first means includes means swivelly connecting said one pair of corresponding ends to said end portions of said connecting member.

* * * * *